US010353947B2

(12) United States Patent
Soni et al.

(10) Patent No.: US 10,353,947 B2
(45) Date of Patent: Jul. 16, 2019

(54) RELEVANCY EVALUATION FOR IMAGE SEARCH RESULTS

(71) Applicant: Adobe Inc., San Jose, CA (US)

(72) Inventors: Sachin Soni, New Delhi (IN); Ashish Duggal, Delhi (IN); Anmol Dhawan, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 551 days.

(21) Appl. No.: 15/137,047

(22) Filed: Apr. 25, 2016

(65) Prior Publication Data

US 2017/0308552 A1   Oct. 26, 2017

(51) Int. Cl.
| | | |
|---|---|---|
| *G06F 16/54* | (2019.01) | |
| *G06F 16/248* | (2019.01) | |
| *G06F 16/58* | (2019.01) | |
| *G06F 16/242* | (2019.01) | |
| *G06F 16/2457* | (2019.01) | |

(52) U.S. Cl.
CPC .......... *G06F 16/54* (2019.01); *G06F 16/243* (2019.01); *G06F 16/248* (2019.01); *G06F 16/24578* (2019.01); *G06F 16/58* (2019.01)

(58) Field of Classification Search
CPC .. G06F 3/0482; G06F 3/04845; G06F 3/0484; G06F 3/04842; G06F 17/30268; G06F 17/30554; G06F 17/30274; G06F 16/243; G06F 16/58; G06F 16/24578; G06F 16/248
USPC ................................ 707/706, 723, 748, 728
See application file for complete search history.

(56) References Cited

U.S. PATENT DOCUMENTS

| | | | |
|---|---|---|---|
| 8,209,330 B1 | 6/2012 | Covell et al. | |
| 8,898,150 B1 | 11/2014 | Kuramochi et al. | |
| 2004/0267740 A1* | 12/2004 | Liu | G06F 17/30256 |
| 2006/0184574 A1* | 8/2006 | Wu | G06F 17/30265 |
| 2007/0209025 A1* | 9/2007 | Jing | G06F 17/30265 |
| 2008/0082426 A1* | 4/2008 | Gokturk | G06F 17/30256 |
| | | | 705/26.62 |
| 2015/0370833 A1 | 12/2015 | Fey et al. | |

* cited by examiner

*Primary Examiner* — Robert W Beausoliel, Jr.
*Assistant Examiner* — Pedro J Santos
(74) *Attorney, Agent, or Firm* — Finch & Maloney PLLC

(57) ABSTRACT

An image search is executed. The search results are presented as a collection of thumbnail images organized according to an initial ranking. As the user browses the thumbnail images, he/she encounters a thumbnail image of interest. Selecting this thumbnail causes an enlarged preview image to be displayed. The user can manipulate the enlarged preview image with panning and zooming operations, thereby enabling the user to more closely inspect portions of the preview image which attract the user's interest. These interactions with the search results, which include the initial selection of the thumbnail image and the subsequent manipulation of the enlarged preview image, provide insight into the user's interest. Once the user has interacted with a threshold quantity of search results, the collection of thumbnail images is filtered and reorganized to more prominently position those search results that correspond to the user's interest, as gleaned from analyzing the aforementioned user interactions.

20 Claims, 12 Drawing Sheets

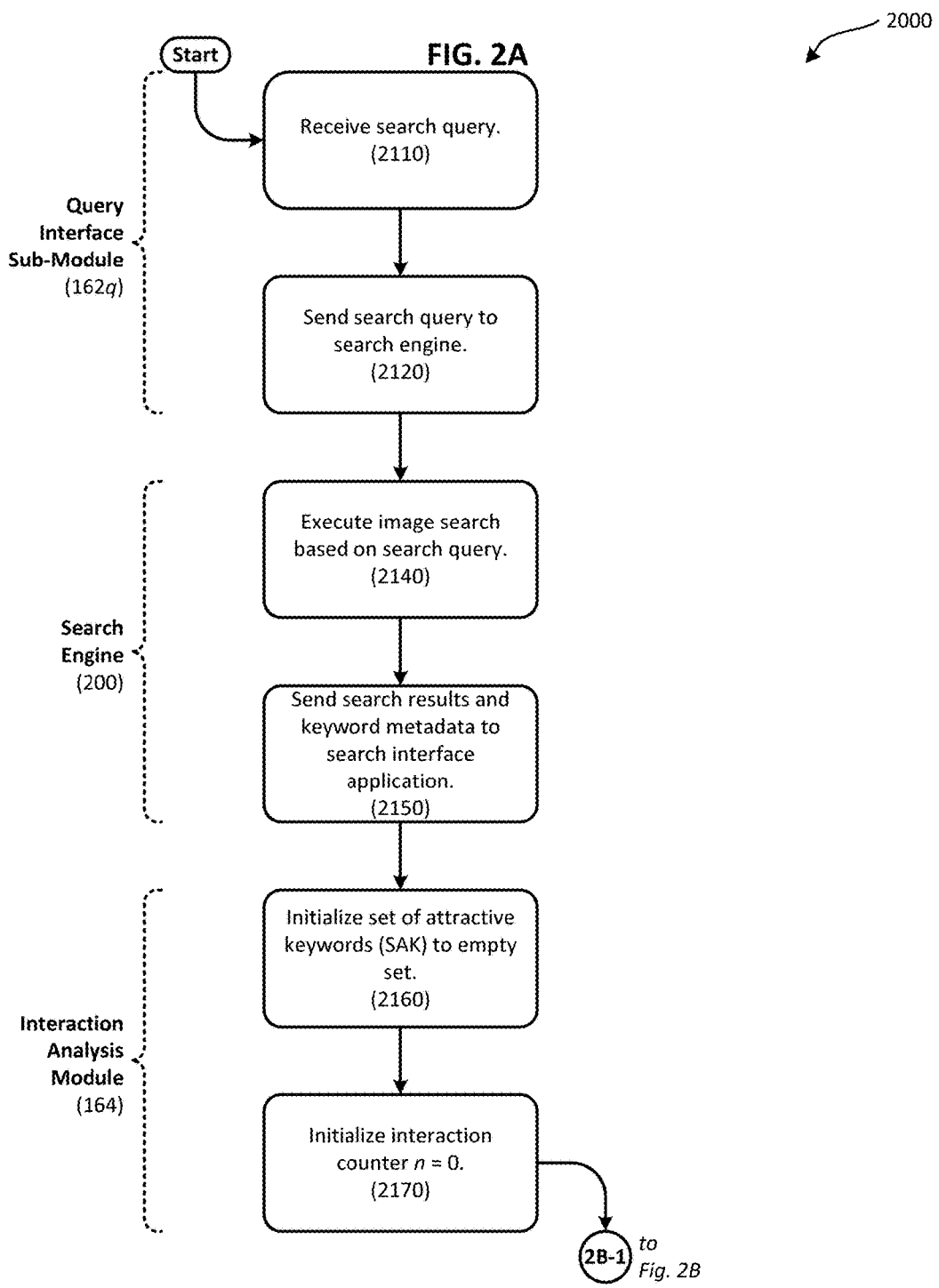

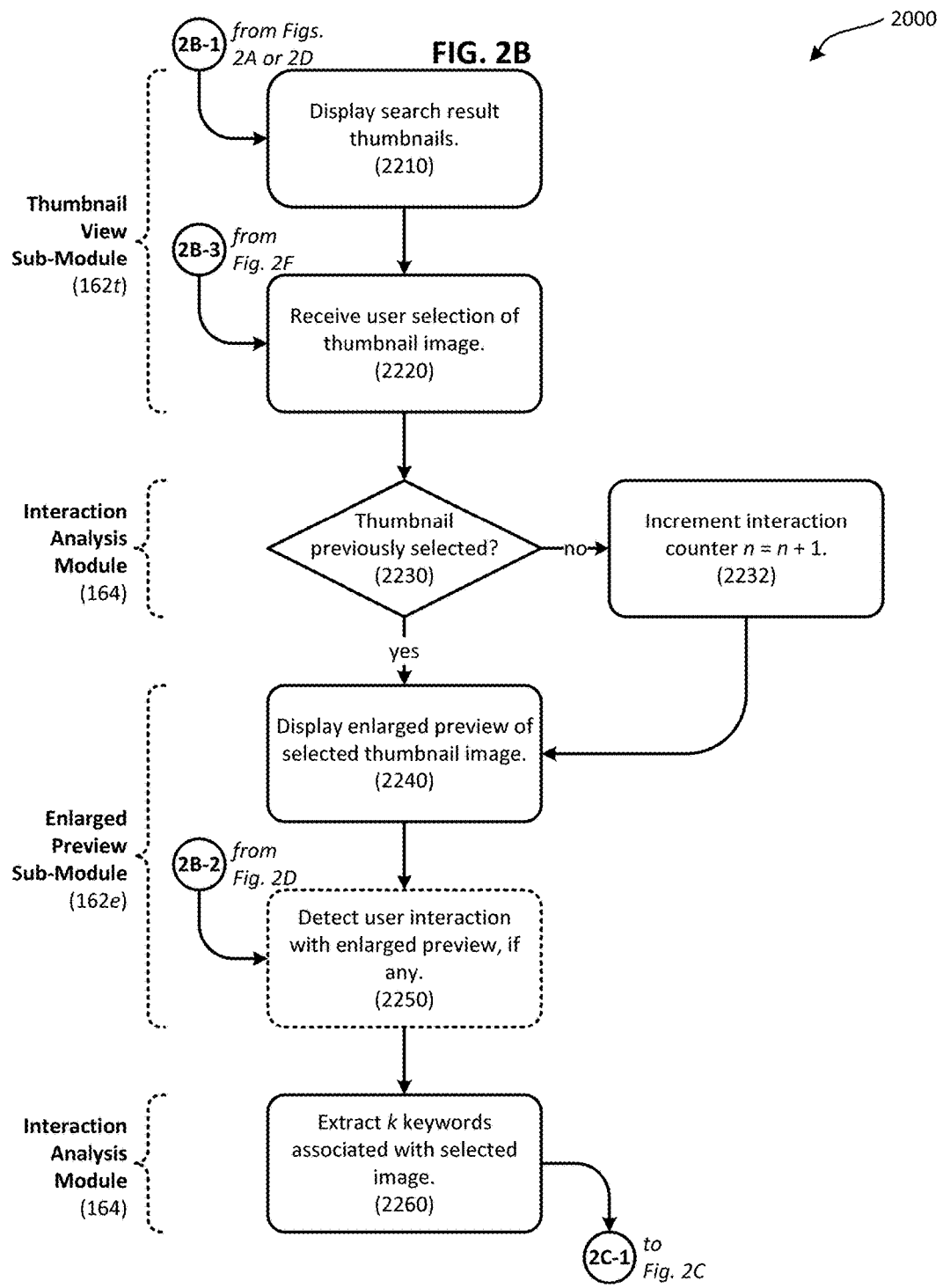

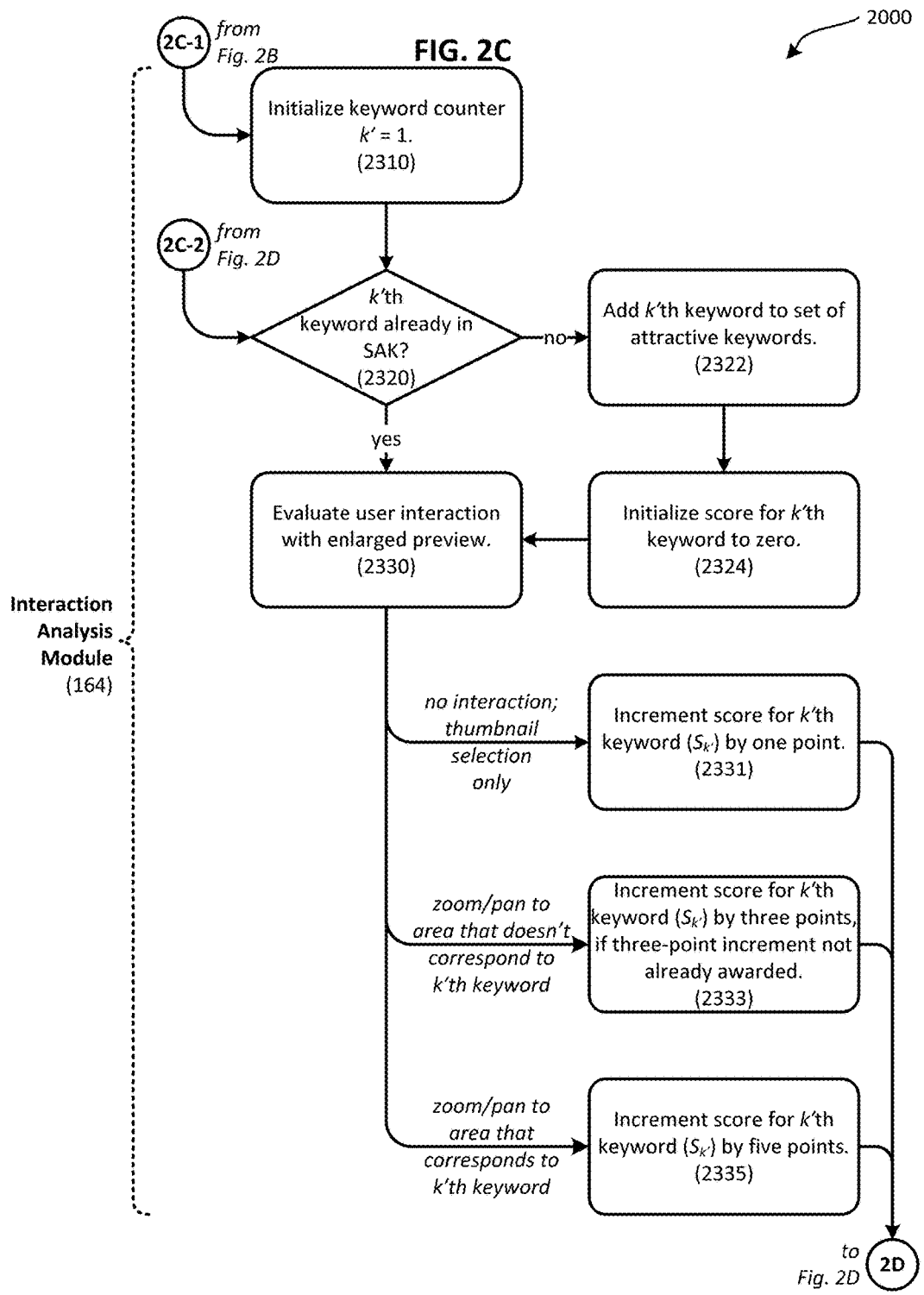

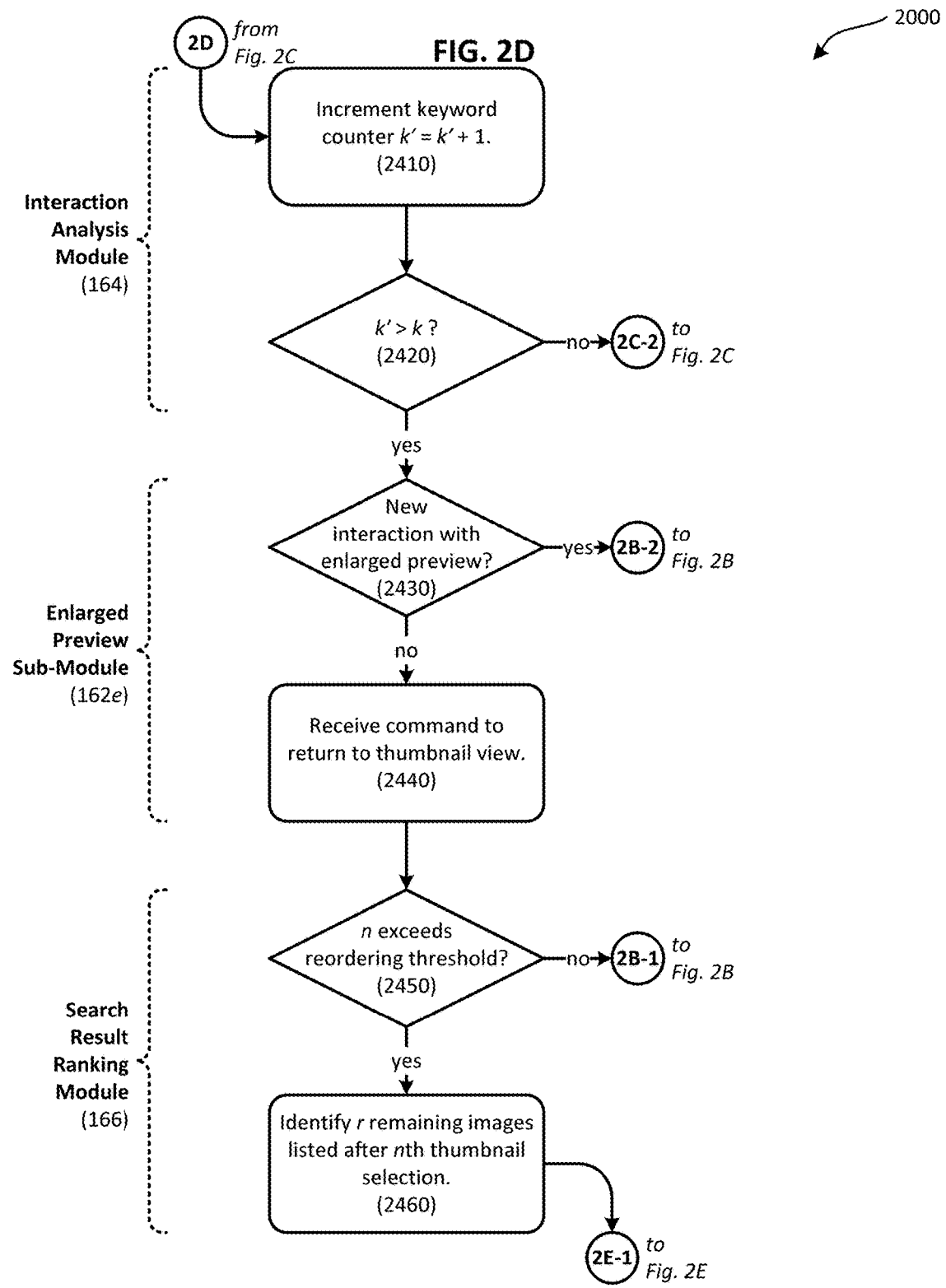

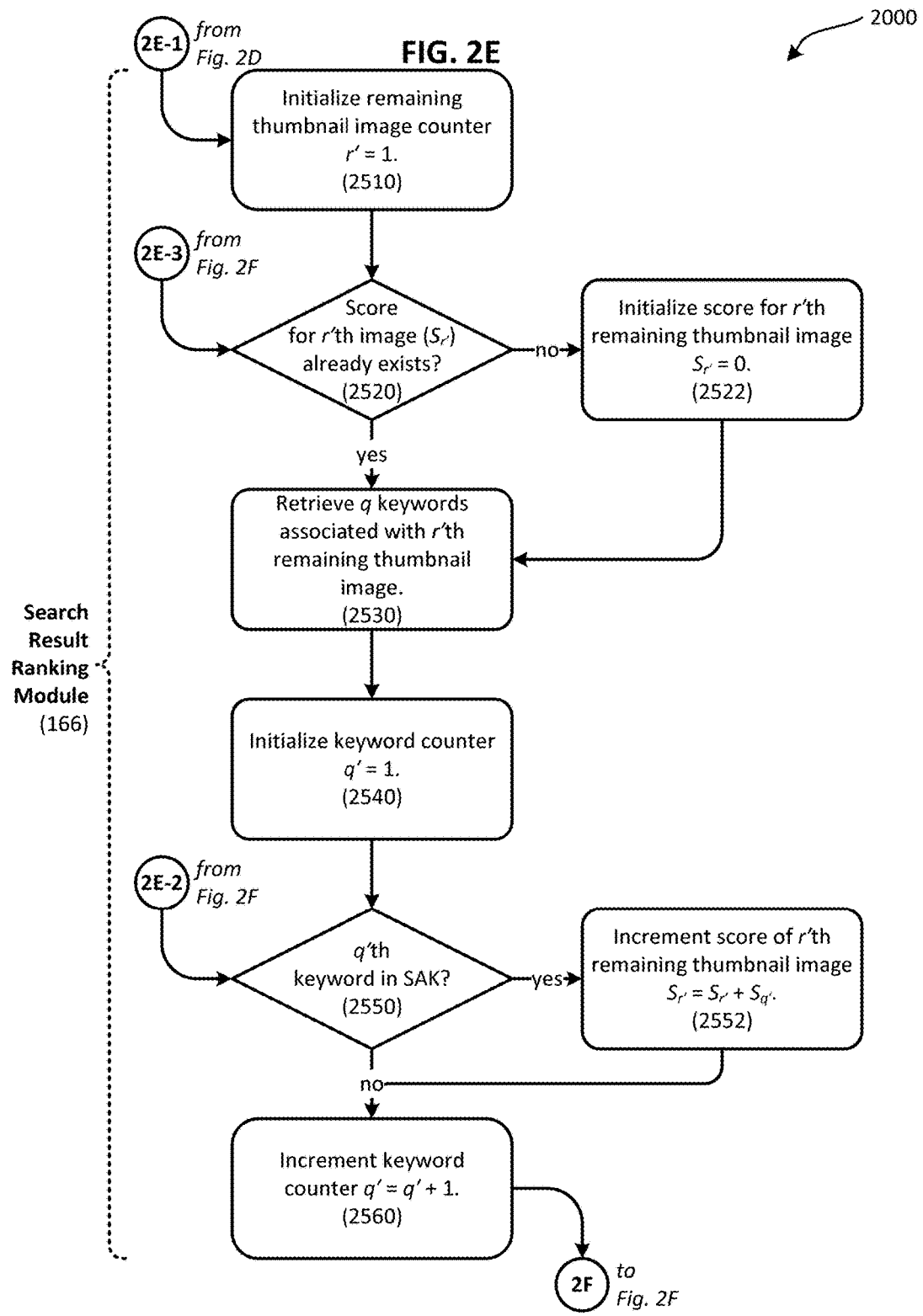

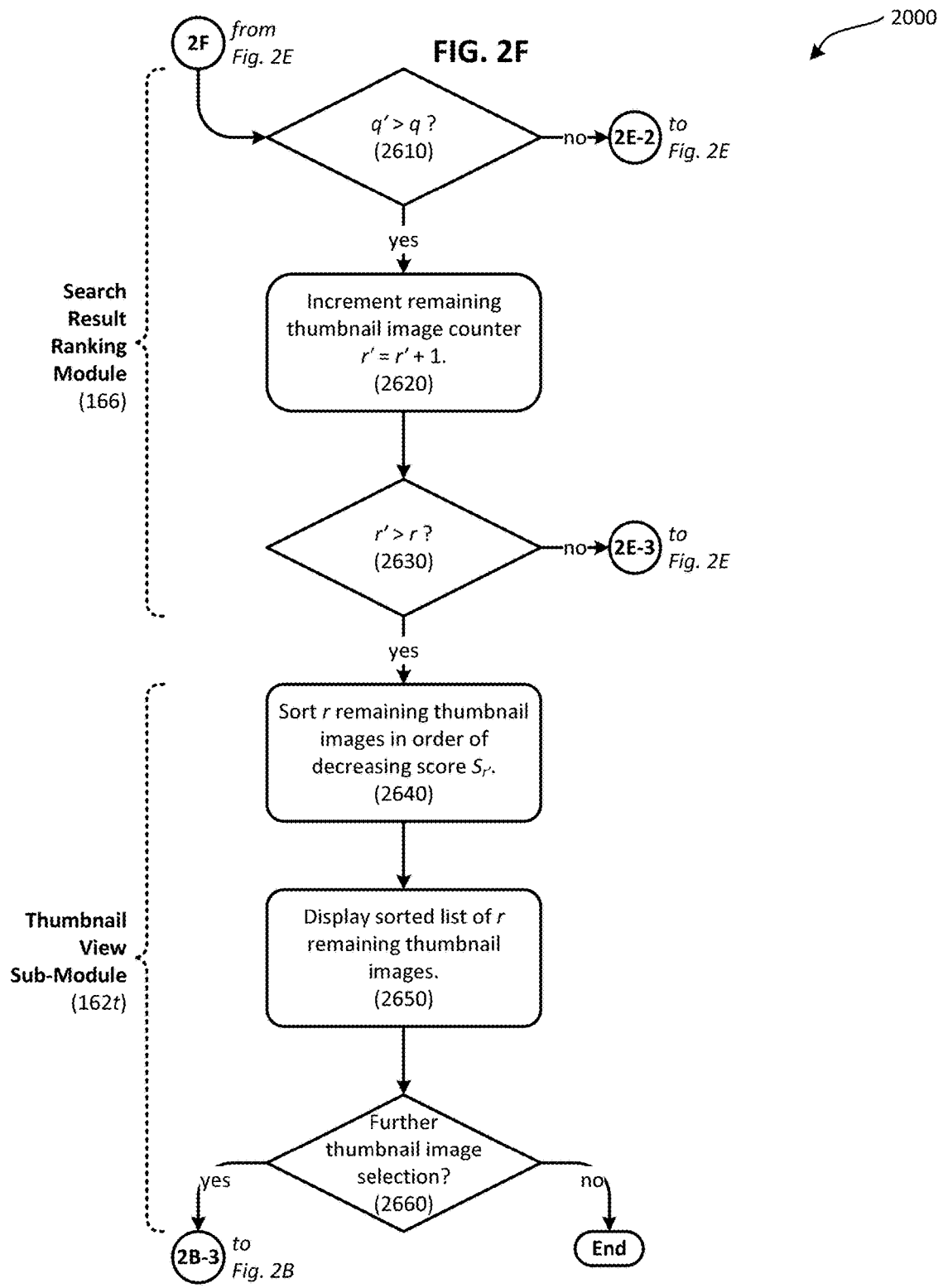

Enlarged Preview User Interface (3200)

Image Identifier (3210)

Enlarged Preview Image (3220)

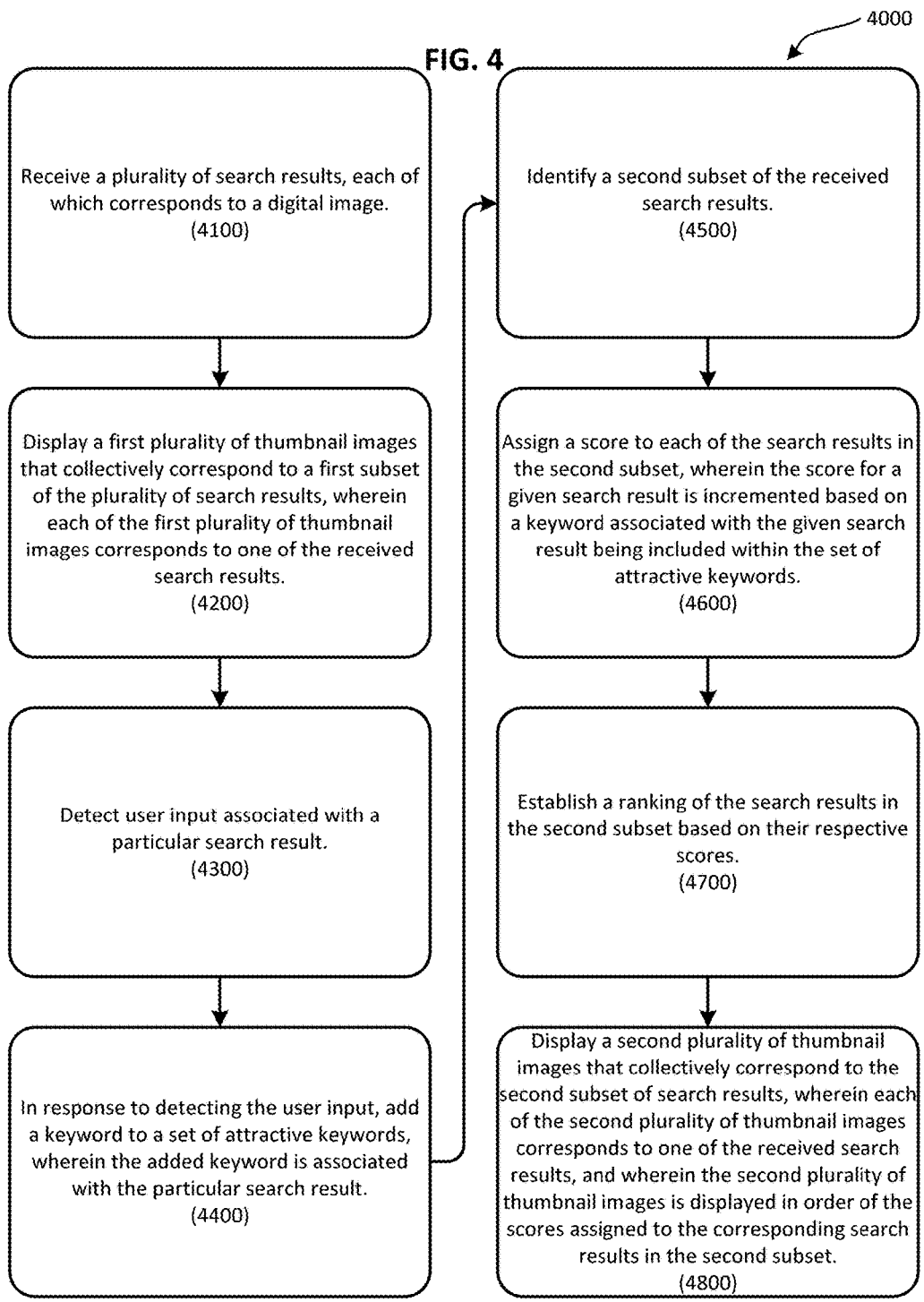

RELEVANCY EVALUATION FOR IMAGE SEARCH RESULTS

FIELD OF THE DISCLOSURE

This application relates generally to organization of search results, and more specifically to techniques for evaluating the relevancy of image search results based on a user's interaction with such results.

BACKGROUND

Modern computer systems provide access to a wide range of digital assets such as documents, webpages, images, multimedia content, and so forth. Given the vast quantity of digital assets that is accessible via a networked computer, a search engine is often used to identify and locate digital assets based on a search query that includes one or more terms or phrases. Search engines are typically configured to display a ranked listing of search results, the ranking being based on a perceived relevance to the search query, with the most relevant search results appearing more prominently in the listing. A wide variety of different ranking algorithms have been developed in an effort to quickly and accurately identify the digital assets that are most relevant to a search query. While such algorithms are often used to perform Internet-based searches, they are also used to locate and identify digital assets within a narrower search field, such as the assets stored on a particular network or managed by a particular content management system. Even within a narrower search field, a ranking algorithm that accurately identifies the most relevant search results is highly valuable.

Searching for digital images presents additional challenges that do not arise when searching for purely text-based assets. For example, it is often difficult to generate a search query that accurately targets a particular image that a user has in mind. Moreover, digital images are often not directly associated with descriptive textual content, thus making it difficult to evaluate the relevance of image search results and present such results to the user in a meaningful way. And along these lines, the results of a digital image search are often presented in the form of a collection of thumbnail images which can be cumbersome to review with a handheld device such as a smartphone or tablet computer. These factors can make searching for digital images a tedious and frustrating process. Existing image-based search engines locate and organize search results by relying on secondary factors such as tags stored in image metadata, textual content located near an image, a user's search history, a user's personal profile, a user's geolocation, or analysis of other images a user has curated. In some cases frequently executed search queries can be saved for future use.

BRIEF DESCRIPTION OF THE DRAWINGS

FIGS. 2A through 2F comprise a flowchart schematically illustrating an example method for evaluating the relevancy of image-based search results in view of observed user interactions with such results.

FIG. 3C is a screenshot illustrating an example enlarged preview user interface that is displayed in response to panning and zooming an enlarged preview image.

FIG. 4 is a flowchart schematically illustrating an example search result display method.

DETAILED DESCRIPTION

Figure 1A:
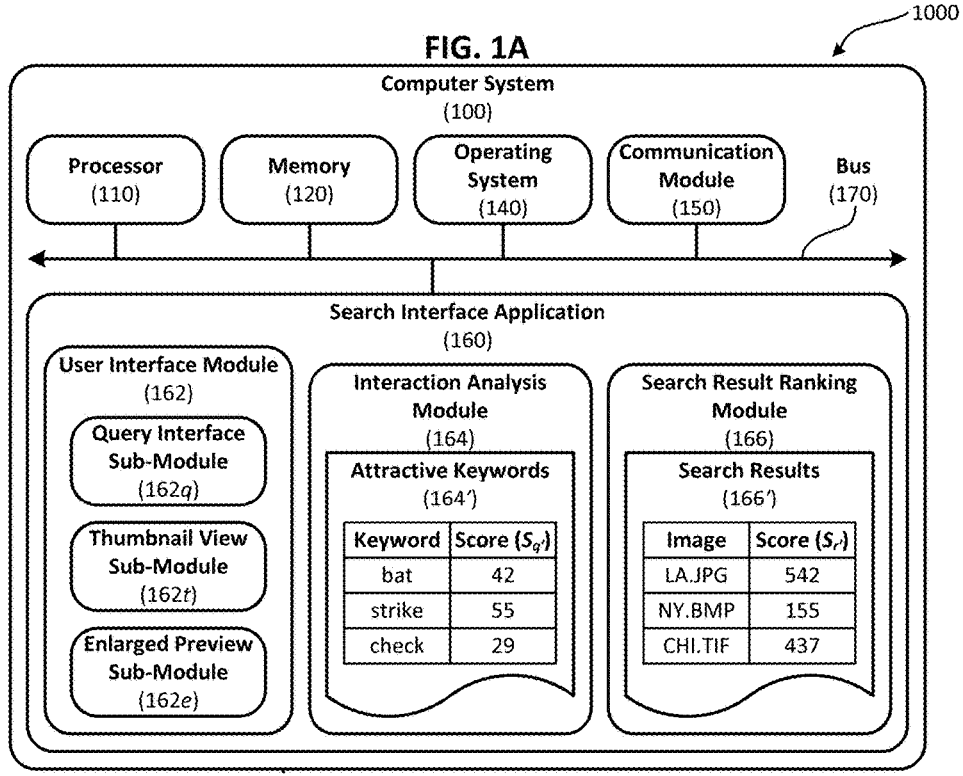
FIG. 1A is a block diagram schematically illustrating selected components of an example computing environment that can be used to evaluate the relevancy of image search results based user interaction with such results, wherein the computing environment includes a computer system.

In accordance with certain of the embodiments disclosed herein, a digital image search is executed in response to a user-specified search query. The search results are presented as a collection of thumbnail images that is organized according to an initial ranking algorithm. As the user browses the thumbnail images, he or she may encounter a thumbnail image of particular interest. Selecting this thumbnail causes an enlarged preview image corresponding to the selected thumbnail to be displayed. The user can manipulate the enlarged preview image with panning and zooming operations, thereby enabling the user to more closely inspect portions of the preview image which attract the user's interest. These interactions with the search results, which include the initial selection of the thumbnail image and the subsequent manipulation of the enlarged preview image, provide insight into the user's interest. Once the user has interacted with a threshold quantity of search results, the collection of thumbnail images is filtered and reorganized to more prominently position those search results that correspond to the user's interest, as gleaned from analyzing the aforementioned user interactions.

For example, suppose a user executes an image search wherein the search query is defined by the terms "baseball" and "California". As the user browses the resulting collection of thumbnail images, she selects images that include members of the Los Angeles Dodgers. Each selection results in the display of a corresponding enlarged preview image. In some cases, where players from multiple teams appear in an enlarged preview image, the user manipulates the preview image with zooming and panning operations to focus on a member of the Los Angeles Dodgers. Analysis of these interactions reveals that the user is particularly interested in seeing images of members of the Los Angeles Dodgers. After a threshold number of such interactions, the originally generated collection of thumbnail images is filtered and reorganized to more prominently display images containing members of the Los Angeles Dodgers. Observing the user's interactions with the search results provides insight into the user's interests, which in turn allows the images which closely correspond to such interests to be identified and featured prominently in the search result listing. This provides a more personalized and efficient user experience that reduces the tedium and frustration associated with browsing through scores of marginally relevant thumbnail images.

As noted above, insight into the user's interest can be gleaned by observing the user's ongoing interactions with the search results. Digital images are often associated with keywords that characterize the image content. These keywords may be defined in a number of different ways, including manually based on user input, or automatically based on any of a variety of existing or subsequently-developed image analysis algorithms. The various techniques disclosed herein operate independently of the particular techniques used to associate keywords with a particular image. Furthermore, in some cases a keyword is associated with an image generally, while in other cases a keyword is associated with a particular region of the image, for example as defined by a subset or range of pixels. For example, a person's face or body may be tagged with the person's name or title as a keyword. A user's selection of a particular thumbnail image evinces an interest in the keywords associated with that image. And a user's panning or zooming to a particular region of a selected image evinces an even greater interest in any keywords associated with that particular region.

As the number of observed interactions increases, the reliability of the insights which may be derived from analyzing such interactions increases as well. As the various user interactions are observed, the keywords corresponding to these interactions are recorded and tallied. In many cases, several different interactions might evince interest in one particularly popular keyword. Once a threshold quantity of interactions is observed, keywords are identified that are especially popular by virtue of the fact that user interactions associated with these keywords are observed with increased frequency. Search results which have not yet been reviewed by the user can therefore be reorganized on the basis of these especially popular keywords. In particular, search results which have not been reviewed, but are associated with particularly popular keywords (for example, by being tagged with the keyword of having a region tagged with the keyword) can be positioned more prominently in a reorganized listing of search results.

The various techniques disclosed herein allow digital images that correspond to a user's interest to be identified quickly, accurately, and intuitively. The user is not required to learn new procedures or invoke specialized query syntax. Rather, the user simply submits the same type of query as might be submitted to a conventional search engine, and reviews the resulting thumbnail images in an intuitive manner to identify images of interest. The techniques disclosed herein analyze these observed interactions and dynamically adjust how the search results are presented to the user. In short, this helps the user see more images that match his or her interests, thereby promoting logical image discovery in a way that is, from the user's perspective, intuitive, seamless, and personalized.

Certain of the embodiments disclosed herein are useful in any application where an image search is executed, and are particularly valuable to users with access to large volumes of digital images since such users are most likely to encounter difficulty in identifying specific assets using existing techniques. This difficulty will be exacerbated as enterprises increase the extent to which digital assets are shared amongst workgroups, and particularly as it becomes easier for individual users to upload and share their digital assets. Users operating in collaborative environments such as these have the most to gain from being able to execute searches that efficiently and accurately identify the digital assets that are most relevant to a search query. For example, in one implementation the various techniques disclosed herein are implemented in conjunction with a digital asset management system such as ADOBE® Experience Manager (Adobe Systems Incorporated, San Jose, Calif.). As digital asset management systems are further integrated into enterprise-based collaborative environments, the demand for the enhanced search functionality disclosed herein will continue to grow.

As used herein, the term "keyword" refers, in addition to its ordinary meaning, to a word or phrase that describes, classifies, or is otherwise associated with a digital image. A keyword may be stored in metadata that forms part of a digital image file, or may be stored in a separate data structure that includes a link to, or is linked by, the associated image. A keyword may be defined manually based on user input, or automatically based on any of a variety of existing or subsequently-developed image analysis algorithms. For example, certain digital asset management systems are configured to automatically assign keywords to new images that are added to a repository. A given digital image may be associated with multiple keywords assigned by multiple entities. In addition, while keywords are often used to describe things that are actually represented in a digital image (for example, "Iwo Jima", "Marines", and "flag"), keywords can also be used to describe other parameters associated with a digital image (for example, the author or photographer, a geolocation, or a genre). While keywords can be associated with a digital image generally, in some instances a keyword is associated with a particular region of an image, for example as defined by a subset or range of pixels. In some applications, a keyword may also be referred to as a "tag".

As used herein, the term "search query" refers, in addition to its ordinary meaning, to a string of characters that is the subject of a search operation that is applied to a repository of digital assets. A search query may comprise a few characters, a partial word, a single word, or multiple words, and may include letters, numbers, punctuation symbols, formatting instructions, metadata that may not necessarily be visible to a user, and any suitable combination of the foregoing. A search query may also include Boolean or other logical operators. A search query may be submitted or otherwise executed using an Internet-based search engine, or alternatively using a "Find" or "Search" command of a software application that is used to access a repository of digital assets (such as a web browser or a content management system portal). In some cases a user may interact with a listing of search results, such as a collection of thumbnail images, by selecting, viewing, or otherwise manipulating a particular search result.

As used herein, the term "search result" refers broadly, in addition to its ordinary meaning, to a reference to a digital image (or identification thereof) that corresponds to a search query in one way or another. Thus in some cases a search result may be an identified image itself, while in other cases the search result may be a thumbnail image or a hyperlink corresponding to an identified image. For example, a search query of "baseball" that is applied to a particular content repository may correspond to 162 images of baseball players, equipment, and venues. The search results generated in response to executing such a query may comprise the 162 images which are actually stored in the content repository, may comprise 162 thumbnail images corresponding to the 162 full-size images, or may simply comprise 162 network addresses that identify where the 162 full-size images are stored. Thus a listing of search results may comprise images, thumbnail images, text, or any appropriate combination of the foregoing.

As used herein, the term "data structure" refers broadly, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree or hierarchical format having a number of nodes; an object format that includes data fields, for instance similar to a record; or any suitable combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a listing of keywords that are perceived as being attractive to a user, and a score that quantifies such attraction. In yet another embodiment a data structure comprises a listing of digital images and a score that quantifies an estimated relevancy of such images to a search query. Numerous other data structure formats and applications will be apparent in light of this disclosure.

System Architecture

Figure 1B:
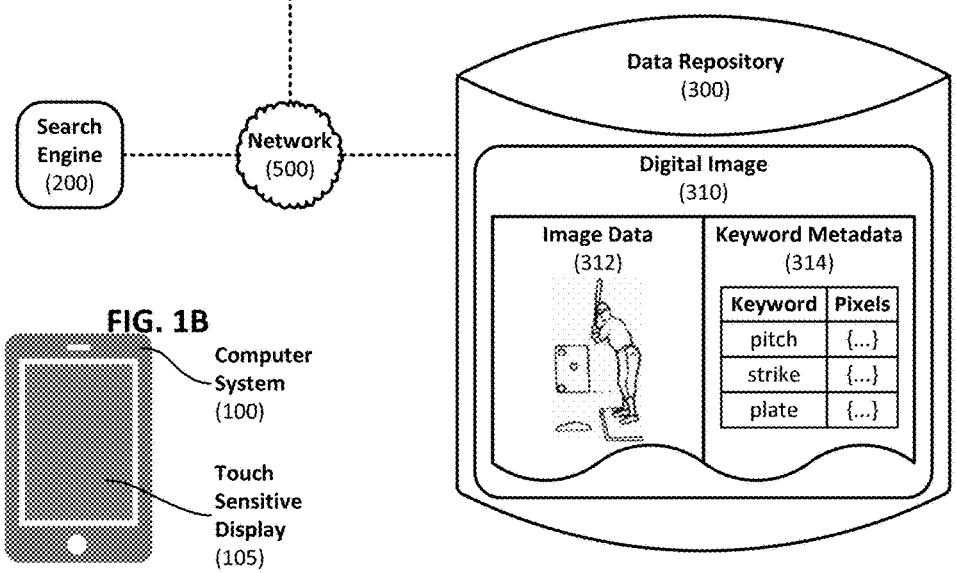
FIG. 1B is a block diagram schematically illustrating an example embodiment of the computer system of FIG. 1A, wherein the computer system is implemented as a smartphone having a touch sensitive display.

FIG. 1A is a block diagram schematically illustrating selected components of an example computing environment 1000 that can be used to evaluate the relevancy of image search results based on user interaction with such results. Computing environment 1000 comprises a computer system 100 that is in communication with, and is capable of accessing services provided by, a search engine 200. Computer system 100 may comprise, for example, one or more devices selected from a desktop computer, a laptop computer, a workstation, a tablet computer, a smartphone, a handheld computer, a set-top box, an enterprise class device, or any other computing device suitable for interfacing with search engine 200. For example, FIG. 1B illustrates an example embodiment wherein computer system 100 is implemented as a smartphone having a touch sensitive display 105 that is capable of displaying a user interface and receiving user input, as will be described in turn. In other embodiments a combination of different devices may be used to provide computer system 100. While only one computer system is illustrated as being in communication with search engine 200 in FIG. 1A, it will be appreciated that, in general, search engine 200 is capable of handling requests received from a large quantity of different computer systems.

Search engine 200 is configured to receive a search query from computer system 100, and in response, to search for digital assets that are stored or indexed in a data repository 300. In some implementations search engine 200 is capable of searching the Internet generally, such as the GOOGLE® (Google Inc., Mountain View, Calif.) or BING® (Microsoft Corp., Redmond, Wash.) search engines. In other implementations the search engine is configured to execute searches on a smaller scale, such as on a collection of digital assets managed by a content management system, one example of which is provided by ADOBE® Experience Manager (Adobe Systems Incorporated, San Jose, Calif.). In some cases search engine 200 is specifically configured to identify digital images that are associated with a received search query, and to provide the user with a listing of search results that includes only digital images.

Data repository 300 represents a collection of searchable data in a general sense, and depending on the particular implementation, may encompass an indexed collection of digital assets that are available via the Internet. In other implementations data repository 300 encompasses a data store that is managed by a content management system through which search engine 200 is provided. In embodiments wherein search engine 200 is specifically configured to search for digital images, data repository 300 includes a plurality of digital images 310, one example of which is illustrated in FIG. 1A. In such embodiments, digital image 310 comprises image data 312 that defines the image itself, and optionally further comprises keyword metadata 314 that defines keywords associated with digital image 310. Each of the defined keywords is optionally associated with a particular set of pixels within the associated digital image 310, thus allowing a particular region of digital image 310 to be associated with a particular keyword. Thus, for example, a photograph containing several people can have the faces of each person tagged with that person's name as a keyword. Where a set of pixels is not defined, the keyword is associated with image 310 generally. Keyword metadata 314 can be stored in a data structure within data repository 300, as illustrated in FIG. 1A. In some cases data repository 300 does not actually include digital assets, but rather includes a searchable index of such assets.

Computer system 100 is optionally coupled to a network 500 to allow for communications with remotely-located computing devices and resources, such as search engine 200 and data repository 300. Network 500 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 500 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, or may require compliance with any other suitable security mechanism.

Still referring to the example embodiment schematically illustrated in FIG. 1A, computer system 100 includes one or more software components configured to implement the various functionalities disclosed herein, as well as hardware that enables such implementation. Examples of such enabling hardware includes a processor 110, a memory 120, a communication module 150, and a bus 170. Examples of implementing software include an operating system 140 and a search interface application 160. In one particular implementation, search interface application 160 further comprises a user interface module 162, an interaction analysis module 164, and a search result ranking module 166. Computer system 100 may include additional, alternative, or fewer hardware and software components in other embodiments, and thus the present disclosure should not be understood as being limited to the particular system architecture illustrated in FIG. 1A.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disc drive, flash memory, or random access memory. In one implementation, memory 120 is used to store one or more of the data structures which are disclosed herein, such as a data structure for attractive keywords 164', and a data structure for search results 166'. Details regarding such data structures will be described herein. Operating system 140 may comprise any suitable operating system, such as GOOGLE® ANDROID™ (Google Inc., Mountain View, Calif.), MICROSOFT® WINDOWS® (Microsoft Corp., Redmond, Wash.), or APPLE® OS X® (Apple, Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently developed platform. Communication module 150 can be any appropriate network chip or chipset which allows for wired or wireless connection to other components of computer system 100 and to network 500, thereby enabling computer system 100 to communicate with other local and remote computer systems, servers, and resources, one example of which is search engine 200. Bus 170 allows for inter- and intra-device communications using communication module 150.

As disclosed herein, computer system 100 is capable of leveraging services provided by search engine 200 to identify digital assets stored in data repository 300 that are of interest to a user. To this end, search interface application 160 facilitates the process of submitting a search query to search engine 200 and organizing the search results generated by search engine 200 in response to such query. In certain embodiments the functionality associated with search interface application 160 is provided by a content management system, a digital asset manager, or any other type of file management system. This facilitates the process of locating digital assets managed by such a system or asset manager. In other implementations the functionality associated with search interface application 160 is provided by a dedicated search application that can be used to locate digital assets in any identified resource, including among assets available on the Internet generally. For example, in one embodiment search interface application 160 is provided as a plugin or applet that functions in conjunction with a web browser that is capable of submitting queries to an Internet-based search engine. This provides a more personalized and targeted user experience in reviewing the results generated by such a search engine. In embodiments wherein computer system 100 is a mobile device, search interface application 160 can be a mobile application downloaded to, and executing on, the mobile device.

Referring still to the example embodiment illustrated in FIG. 1A, user interface module 162 comprises instructions encoded on a computer readable medium that, when executed using processor 110, cause functionality associated with a user interface to be provided. In one aspect, such functionality includes the ability to receive search queries provided by a user, as provided by a query interface sub-module 162q. For example, in certain embodiments query interface sub-module 162q provides a text entry user interface element where a user can type a search query that is to be submitted to search engine 200. Other user interface elements can be provided in other embodiments, such as dropdown menus and radio buttons that help a user create a Boolean query, or a speech-to-text processor that converts a spoken query to a textual query. In some embodiments query interface sub-module 162 provides an option to save a frequently executed query, as well as to retrieve saved queries.

Figure 3A:
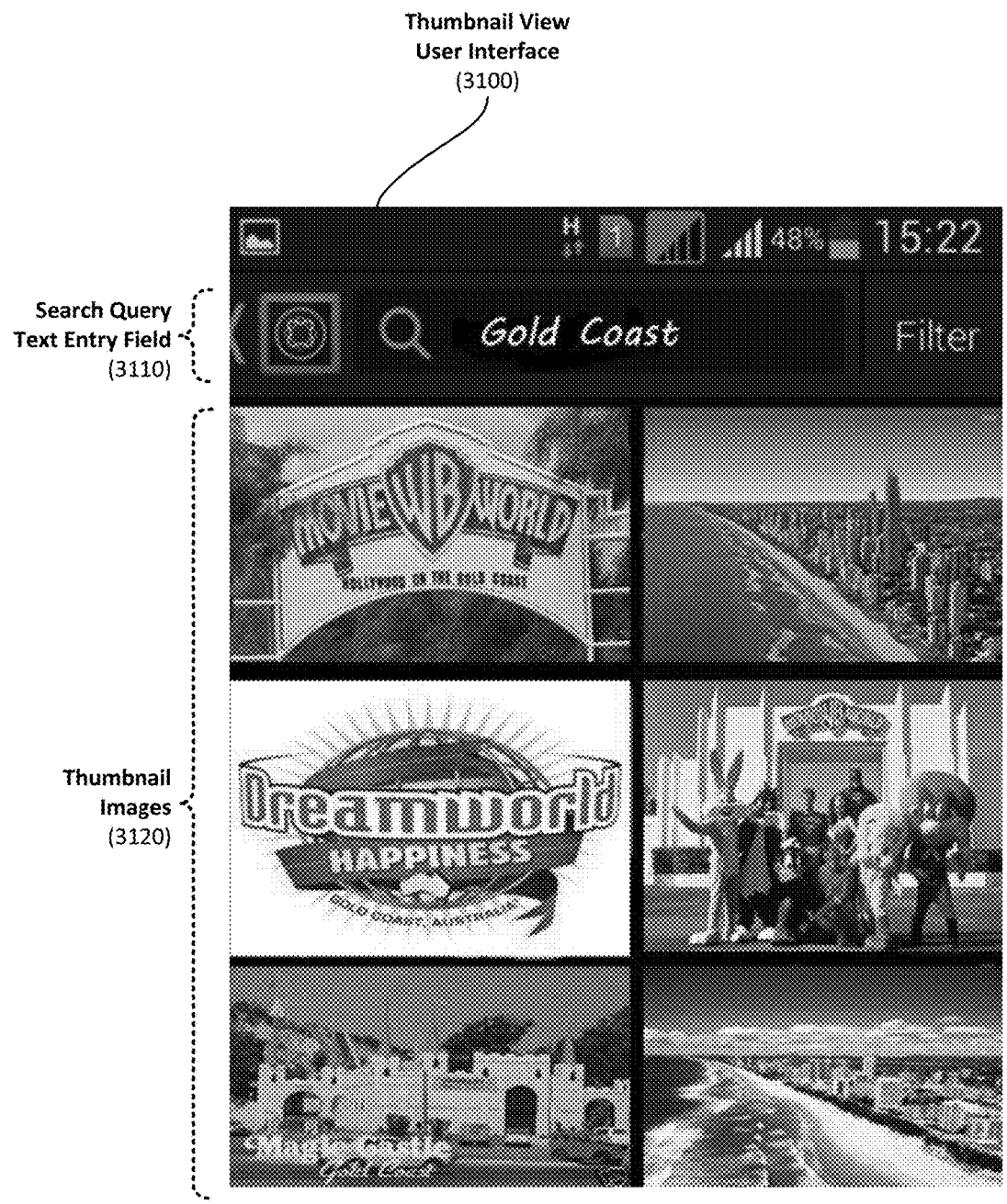
FIG. 3A is a screenshot illustrating an example thumbnail view user interface that includes a plurality of thumbnail images that are arranged without regard to user interaction therewith.

In another aspect, the functionality provided by user interface module 162 facilitates display and evaluation of image-based search results that are generated when search engine 200 executes a search query. For example, in certain embodiments a thumbnail view sub-module 162t provides a thumbnail view user interface that displays one or more thumbnail images, each of which corresponds to one of the generated search results. FIG. 3A is a screenshot illustrating an example thumbnail view user interface 3100 that includes a plurality of thumbnail images 3120 generated in response to the query "Gold Coast", which has been entered in a search query text entry field 3110. While the example user interface of FIG. 3A displays six thumbnail images per page, it will be appreciated that more or fewer thumbnail images may be displayed per page in other embodiments. In certain implementations, the size of the thumbnail images, and therefore the number of displayed thumbnail images on a given page, is user-configurable.

Figure 3B:
FIG. 3B is a screenshot illustrating an example enlarged preview user interface that is displayed in response to selecting a thumbnail image appearing in a thumbnail view user interface.

A user may wish to view a larger version of one of the thumbnail images, and thus in some embodiments thumbnail view sub-module 162t responds to selection of a thumbnail image by calling functionality provided by an enlarged preview sub-module 162e. Enlarged preview sub-module 162e provides an enlarged preview user interface that displays an enlarged preview of a selected thumbnail image. FIG. 3B is a screenshot illustrating an example enlarged preview user interface 3200 that includes an enlarged preview image 3220 corresponding to a selected thumbnail image 3120 that appears in thumbnail view user interface 3100. Enlarged preview user interface 3200 includes an image identifier 3210 associated with enlarged preview image 3220. Enlarged preview user interface 3200 is optionally responsive to user input that defines panning or zooming operations, thereby allowing a user to focus on a particular region of interest of the enlarged preview image. FIG. 3C is a screenshot illustrating example enlarged preview user interface 3200 after the user had performed panning and zooming operations, thus resulting in a panned and zoomed preview image 3230.

As noted previously, search interface application 160 is capable of organizing and filtering the search results that are generated by search engine 200. In certain implementations these operations are responsive to user interaction with search results displayed in thumbnail view user interface 3100 and enlarged preview user interface 3200. In such implementations search interface application 160 further includes interaction analysis module 164, which comprises instructions encoded on a computer readable medium that, when executed using processor 110, cause user search result interactions to be observed, analyzed, and recorded in a data structure. For instance, certain user interactions can be associated with a particular keyword. Examples of such user interactions include, but are not limited to, selecting a thumbnail image that is associated with a particular keyword, or zooming to a region within an enlarged preview image that is associated with a particular keyword. Because these keywords are associated with expressions of user interest, they are referred to herein as "attractive keywords". As user interactions with the search results are observed, interaction analysis module 164 tallies a score for the attractive keywords that are associated with these interactions. An interaction that evinces greater interest in a particular keyword causes the score for that keyword to be incremented to a greater extent. Attractive keywords with a higher score are therefore assumed to be more relevant to a user's interests. The attractive keywords and corresponding scores are correlated and stored in a data structure for attractive keywords 164' that interaction analysis module 164 maintains. In certain embodiments interaction analysis module 164 provides means for analyzing user interactions with images displayed in the thumbnail view user interface and the enlarged preview user interface based on the operations indicated in FIGS. 2A through 2F and described herein.

Still referring to the example embodiment illustrated in FIG. 1A, search interface application 160 further includes search result ranking module 166, which comprises instructions encoded on a computer readable medium that, when executed using processor 110, cause a collection of search results to be ranked based on user interactions with said search results. As noted above, certain keywords can be deemed as being relevant to a user's interests based on that user's interactions with a collection of search results. In many applications, a particular search result is a digital image that is associated with keyword metadata, such as digital image 310 that is schematically illustrated in FIG. 1A. In this case, search result ranking module 166 calculates a score for each of the search results, wherein the score is an aggregate sum of the scores for the keywords associated with that search result. The search results with the highest scores will therefore be understood as being more relevant to the user's interests. Search result ranking module 166 is further configured to organize the search results based on these aggregate scores, thus enabling thumbnail view sub-module 162t to display the most relevant search results more prominently. In some cases thumbnails with which a user has already interacted are omitted from a reorganized list of thumbnail images. The search results and corresponding scores are correlated and stored in a data structure for search results 166' that search results ranking module 166 maintains. In certain embodiments search result ranking module 166 provides means for ranking of plurality of search results based on a search result score calculated for each of a plurality of search results, based on the operations indicated in FIGS. 2A through 2F and described herein.

Figure 3D:
FIG. 3D is a screenshot illustrating an example reordered thumbnail view user interface that is displayed in response to user interaction with the results of a digital image search.

Thus, FIG. 3D is a screenshot illustrating an example reordered thumbnail view user interface 3300 that is displayed in response to observed user interactions with the results of a digital image search. In particular, user interface 3300 includes a plurality of remaining reordered thumbnail images 3320 which are organized based on observed user interactions with other search results. In this particular example, these user interactions include the user's selection of a particular image for display in enlarged preview user interface 3200, and the user's further panning and zooming operations as performed on the enlarged preview image. The collection of remaining reordered thumbnail images 3320 does not include thumbnail images with which the user has already interacted. Reordered thumbnail view user interface 3300 further includes a search query text entity field 3310 which displays the search query ("Gold Coast") that produced the search results corresponding to the displayed thumbnail images 3320.

The embodiments described herein can be implemented in various forms of hardware, software, firmware, or special purpose processors. For example, in one embodiment a non-transitory computer readable medium has instructions encoded thereon that, when executed by one or more processors, cause one or more of the search result relevancy evaluation methodologies disclosed herein to be implemented. The instructions can be encoded using any suitable programming language, such as C, C++, object-oriented C, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment the system is hosted on a given website and implemented, for example, using JavaScript or another suitable browser-based technology. The website can be accessed using a browser installed on a smartphone or other portable electronic device.

The functionalities disclosed herein can optionally be incorporated into a variety of different software applications, including mobile applications installed on a smartphone, tablet computer, or other portable electronic device. The functionalities disclosed herein can additionally or alternatively leverage services provided by, or be integrated into, other software applications, such as content management systems, digital asset management systems, web browsers, and operating systems. Thus, while certain of the embodiments disclosed herein are described in the context of searching for digital images managed by a digital asset manager, in alternative implementations the techniques disclosed herein can also be used to organize search results generated by an Internet search engine. The computer software applications disclosed herein may include a number of different modules, sub-modules, or other components of distinct functionality, and can provide information to, or receive information from, still other components and services. These modules can be used, for example, to communicate with input and output devices such as a display screen, a touch sensitive surface, a speaker, a microphone, and any other suitable input/output device. Other components and functionalities not reflected in the illustrations and description provided herein will be apparent in light of this disclosure, and it will be appreciated that the present disclosure is not intended to be limited to any particular hardware or software configuration. Thus in other embodiments the components illustrated in FIG. 1A may include additional, fewer, or alternative subcomponents.

The aforementioned non-transitory computer readable medium may be any suitable medium for storing digital information, such as a hard drive, a server, a flash memory, or random access memory. In alternative embodiments, the components and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and number of embedded routines for carrying out the various functionalities disclosed herein. It will be apparent that any suitable combination of hardware, software, and firmware can be used, and that the present disclosure is not intended to be limited to any particular system architecture.

Methodology

FIGS. 2A through 2F comprise a flowchart schematically illustrating an example method 2000 for evaluating the relevancy of image-based search results in view of observed user interactions with such results. As can be seen, method 2000 includes a number of phases and sub-processes, the sequence of which may vary from one embodiment to another. However, when considered in the aggregate, these phases and sub-processes form part of an improved relevancy evaluation technique that is capable of inferring a user's interest and reorganizing search results based on the inferred interest. Method 2000 is responsive to observed user input in accordance with certain of the embodiments disclosed herein, and can be implemented using a computer system such as that schematically illustrated in FIG. 1A and described herein. However, the correlation of the various functionalities shown in FIGS. 2A through 2F to the specific components illustrated in FIG. 1A is not intended to imply any structural or use limitations. Rather, other embodiments may include, for example, varying degrees of integration wherein multiple functionalities are effectively performed by one system or module. For example, in an alternative embodiment a single module is used to analyze user interactions with search results and reorganize such results based on the analyzed interactions. Thus other embodiments may have fewer or more modules depending on the granularity of implementation. Numerous variations and alternative configurations will be apparent in light of this disclosure.

As illustrated in FIG. 2A, method 2000 commences with using query interface sub-module 162$q$ to receive a search query. See reference numeral 2110 in FIG. 2A. A user can provide the search query in a number of different ways, such as by typing the query into a text entry field, providing a spoken input that is processed by a speech-to-text application, or invoking user interface elements such as dropdown menus or radio buttons to define a Boolean query. In alternative embodiments a search query is generated automatically in response to a detected condition, such as selection or display of a reference image. Regardless of how it is initially defined, the received search query is sent to search engine 200 via network 500. See reference numeral 2120 in FIG. 2A. In an alternative embodiment, the functionality associated with search engine 200 is provided at computer system 100, thus eliminating any need to transmit the search query across network 500.

Search engine 200 executes an image search based on the received search query. See reference numeral 2140 in FIG. 2A. In general, executing an image search comprises searching for digital images that are stored or indexed in a data repository, such as the networked data repository 300 illustrated in FIG. 1A. The image search identifies a plurality of digital images that correspond to the search query in one way or another; these digital images (or identification thereof) are referred to herein as the "search results". In some cases the image search is a reverse image search, wherein the search query comprises a query image and the search results are images identified as being related to the query image. A wide range of technologies exist for executing an image search, examples of which are provided by the GOOGLE® (Google Inc., Mountain View, Calif.) or BING® (Microsoft Corp., Redmond, Wash.) Internet-based search engines. Subsequently-developed search engines and algorithms can be used in other embodiments. In implementations wherein method 2000 is invoked in the context of a content management system, search engine 200 can be configured to search for digital images that are managed by the content management system or by a digital asset manager associated with the content management system. Once the image search has been executed, search engine 200 sends the identified search results, and keyword metadata that is associated with the identified search results, to search interface application 160. See reference numeral 2150 in FIG. 2A. In some cases the search results which are transmitted to search interface application 160 include full-size copies of the identified images themselves, while in other cases the transmitted search results include only a network address or a thumbnail image for each identified image.

As noted above, interaction analysis module 164 facilitates the observation, analysis, and recording of user interactions with search results that are generated by, and received from, search engine 200. This analysis provides insight into the user's interests, thus allowing the search results to be reorganized accordingly. For example, search results that are perceived as being more relevant to the user's interests can be listed or positioned more prominently. In an example embodiment, the user's interests are inferred based on an analysis of keywords that are associated with search result images that the user interacts with. These keywords are compiled in a set of "attractive keywords" that is initially initialized to the empty set. See reference numeral 2160 in FIG. 2A. In certain embodiments the search results are reorganized only after observing a threshold number of interactions with unique search results, since this tends to provide for a more accurate evaluation of the user's interest. Once the threshold number of interactions has been observed, each subsequent interaction can result in further refinement of the search results. To this end, an interaction counter n that equals the number of different search results with which the user has interacted is initialized to zero. See reference numeral 2170 in FIG. 2A.

Upon receipt of the search results at search interface application 160, thumbnail view sub-module 162$t$ displays thumbnail images associated with the search results. See reference numeral 2210 in FIG. 2B. Where the search results received from search engine 200 do not include thumbnail images, search interface application 160 can be configured to either generate thumbnail images from received full-size images, or retrieve thumbnail images from data repository 300. Regardless of how they are generated, the thumbnail images can be understood as being displayed in an "initial thumbnail display sequence", such as may be provided by a ranking algorithm implemented by search engine 200. In general, the initial thumbnail display sequence may be any arbitrary order, and thus in one particular implementation the thumbnail images are initially displayed in a random order. Where the number of search results produced by search engine 200 exceeds the number of thumbnail images which can reasonably be displayed on one page, thumbnail view sub-module 162$t$ is configured to provide scrolling or pagination functionality that allows the user to browse through multiple pages of thumbnail images. Such functionality may be implemented using scrollbars, swiping gestures, or the like. FIG. 3A is a screenshot illustrating thumbnail view user interface 3100, which includes a plurality of thumbnail images 3120 generated in response to the query "Gold Coast", which has been entered in search query text entry field 3110.

As the user browses the thumbnail images, he or she may encounter a particular image that piques his or her interest. The user selects this image of interest, for example by clicking, tapping, or applying any other suitable selection input to the image. See reference numeral 2220 in FIG. 2B. Such selection can be interpreted as an indication that the selected image is more likely to be relevant to the user's interest as compared to other unselected images. In embodiments wherein the search results are reorganized after a threshold number of observed interactions with unique search results, a determination is made with respect to whether the particular thumbnail image has previously been selected since receiving the search results. See reference numeral 2230 in FIG. 2B. If not, the interaction counter n is incremented, such that n=n+1. See reference numeral 2232 in FIG. 2B. Otherwise, the interaction counter n is not incremented. However, in an alternative embodiment, the interaction counter n is incremented in response to any selection of a search result thumbnail, regardless of whether that thumbnail has been previously selected. In either case, interaction analysis module 164 is configured to manage interaction counter n.

Further in response to the user's selection of a particular thumbnail image of interest, enlarged preview sub-module 164e displays an enlarged preview of the thumbnail image. See reference numeral 2240 in FIG. 2B. The enlarged preview image affords the user a better opportunity to more closely inspect the selected thumbnail image. FIG. 3B is a screenshot illustrating an example enlarged preview user interface 3200 that includes enlarged preview image 3220. Enlarged preview image 3220 corresponds to a selected thumbnail image 3120 appearing in thumbnail view user interface 3100. In such embodiments enlarged preview sub-module 162e is capable of detecting and responding to user interactions with the enlarged preview image, if any. See reference numeral 2250 in FIG. 2B. Examples of such interactions include zooming and panning operations. Interactions such as these can provide further insight into the user's interest, particularly where the user zooms or pans to a region of the enlarged preview image that is specifically associated with a keyword. For example, zooming and panning operations can be used to focus on the "Movie WB World" logo that is visible in enlarged preview image 3220 illustrated in FIG. 3B. The result of such operations is panned and zoomed preview image 3230 illustrated in FIG. 3C. Thus even though the user's search query was "Gold Coast" (see search query text entry field 3110 in FIG. 3A), the user's subsequent interactions evince an interest in "Movie WB World", an amusement park on the Gold Coast. If the "Movie WB World" logo illustrated in FIGS. 3B and 3C is tagged with a keyword, this keyword can be used to derive the user's interest, as will be described in turn. In an alternative embodiment, simply tapping, clicking, or otherwise selecting portions of an enlarged preview image will evince interest in the selected region, thus eliminating any need to actually invoke zooming or panning functionality.

In response to detecting the user's thumbnail selection, and any subsequent zooming and panning operations applied to the resulting enlarged preview image, interaction analysis module 164 extracts k keywords associated with the selected image. See reference numeral 2260 in FIG. 2B. To facilitate incremental analysis of the k extracted keywords, interaction analysis module 164 compares the fixed quantity k to an incrementing keyword counter k'. The incrementing keyword counter k' is initially set such that k'=1, and it increments as each of the k keywords is analyzed. See reference numeral 2310 in FIG. 2C. Once k'>k, analysis of the k keywords is complete. A determination is made with respect to whether the k'th keyword is already in the set of attractive keywords. See reference numeral 2320 in FIG. 2C. If not, the k'th keyword is added to the set of attractive keywords. See reference numeral 2322 in FIG. 2C. As illustrated in FIG. 1A, the attractive keywords are stored in a data structure that associates each attractive keyword with a corresponding score. The newly added k'th keyword is associated with an initial score of zero. See reference numeral 2324 in FIG. 2C. The score associated with the k'th keyword is referred to herein and in subsequent analysis as $S_{k'}$.

Interaction analysis module 164 evaluates the user interaction with the enlarged preview image. See reference numeral 2330 in FIG. 2C. If no such interaction is detected, that is, if the user only selected a thumbnail image without any further interaction with the subsequently displayed enlarged preview image, the score associated with the k'th keyword is incremented by one point. See reference numeral 2331 in FIG. 2C. If the user zoomed or panned to a particular region of the enlarged preview image, but the particular region does not correspond to the k'th keyword, the score associated with the k'th keyword is incremented by three points. See reference numeral 2333 in FIG. 2C. Optionally, this three-point increment is applied only once for a given keyword, such that subsequent interactions with the same selected image do not result in the k'th keyword receiving an additional three-point increment. If the user zoomed or panned to a particular region of the enlarged image that corresponds to the k'th keyword, the score associated with the k'th keyword is incremented by five points. See reference numeral 2335 in FIG. 2C.

While one-, three-, and five-point increments are used in certain embodiments, different value point increments can be implemented in other embodiments. For instance, in one alternative embodiment the five-point increment is reduced in proportion to the amount of the region that is tagged with the k'th keyword falling within the zoomed or panned region. One way of determining how much of the tagged region falls within the zoomed or panned region is by counting pixels within the tagged region and the zoomed or panned region, and determining a proportion of overlap. Thus, if the region that is tagged with the k'th keyword is entirely within the zoomed or panned region (for example, 100% overlap), the full five-point increment is applied to the k'th keyword. On the other hand, if only one-third of the region that is tagged with the k'th keyword is within the zoomed or panned region (for example, 33% overlap), then a (5×⅓)-point increment is applied. In another alternative embodiment, feedback other than zooming and panning operations is used to identify particular regions of interest in the enlarged preview image. For example, in a modified embodiment pupil tracking technology is used to detect which regions of the enlarged preview image attract the user's attention.

Once the score associated with the k'th keyword is appropriately incremented and recorded in the data structure for attractive keywords 164', the keyword counter k' is incremented such that k'=k'+1. See reference numeral 2410 in FIG. 2D. The incremented keyword counter k' is then compared to the total quantity of keywords k which were identified as being associated with the selected image. See reference numeral 2420 in FIG. 2D. If k'≤k, then there are additional keywords which should be similarly processed by interaction analysis module 164, as disclosed herein. See reference numeral 2320 and what follows in FIG. 2C. However, if k'>k, then all keywords have been analyzed. In this case, enlarged preview sub-module 162e detects any new user interactions with the enlarged preview image. See reference numeral 2430 in FIG. 2D. A new interaction with the enlarged preview image occurs, for example, when the user zooms or pans to different region of the image. If a new interaction is detected, then it is processed as described herein. See reference numeral 2250 and what follows in FIG. 2B.

Once all k keywords that are associated with selected image are processed, and once the user is finished interacting with the enlarged preview image, the user will invoke a command to return to the thumbnail view. See reference numeral 2440 in FIG. 2D. Such a command may be invoked, for example, by selecting a "back" button or user interface element. In response to such a command, search result ranking module 166 determines whether n exceeds a pre-established threshold number of observed interactions with unique search results. See reference numeral 2450 in FIG. 2D. In one embodiment the pre-established threshold is five interactions with unique search results. In an alternative embodiment the pre-established threshold is one interaction with a unique search result, meaning that the search results are reorganized after the first observed interaction. In still other embodiments the pre-established threshold is selected from a group consisting of two, three, four, five, six, seven, eight, nine, ten, fifteen, and twenty interactions with unique search results.

If n does not exceed the pre-established threshold, the thumbnail images are redisplayed without any reorganization. See reference numeral 2210 and what follows in FIG. 2B. Otherwise, r remaining thumbnail images are identified. See reference numeral 2460 in FIG. 2D. The r remaining thumbnail images correspond to those thumbnail images that were listed below the most recently selected thumbnail image in the most recently displayed collection of thumbnail images. Thus, for example, if the thumbnail images have never been reorganized since search engine 200 first sent search results to search interface application 160, the r remaining thumbnail images correspond to those images that were listed below the most recently selected thumbnail image in the initial thumbnail display sequence. If the thumbnail images have been reorganized, the r remaining thumbnail images correspond to those images that were listed below the most recently selected thumbnail image in the reorganized sequence of thumbnail images. In this context, "listed below" refers to the positioning of a thumbnail image subsequent to, after, beyond, or with a lower ranking in the listing of thumbnail images displayed by thumbnail view sub-module 162*t*. Reorganizing only the r remaining thumbnail images prevents the user from being presented with search results that he or she has already viewed. In some implementations thumbnails corresponding to search results which the user has previously selected are still displayed in thumbnail view user interface, but are displayed above or otherwise separated from the r remaining thumbnail images. This makes it easier for a user to curate thumbnails that are of particular interest. In alternative embodiments, thumbnails corresponding to search results which the user has previously selected are not subsequently displayed in thumbnail view user interface.

In general, the r remaining thumbnail images are reorganized such that images that more closely align with the user's inferred interest are positioned more prominently, for example, closer to the top of the listing or results. The user's inferred interest is defined by the keywords which were determined to have the highest scores based on the observed user interactions, as recorded in the data structure for attractive keywords 164'. In general, a remaining thumbnail image which is associated with keywords having relatively high scores in the data structure for attractive keywords 164' should be listed more prominently than a thumbnail image that is not associated with such keywords. One way of implementing such a reorganization of the r remaining thumbnail images is described in turn.

For example, to facilitate incremental analysis of the r remaining thumbnail images, search result ranking module 166 compares the fixed quantity r to an incrementing remaining thumbnail image counter r'. The incrementing remaining thumbnail image counter r' is initially set such that r'=1, and it increments as each of the r remaining thumbnail images is analyzed. See reference numeral 2510 in FIG. 2E. Once r'>r, analysis of the r remaining thumbnail images is complete. As illustrated in FIG. 1A, some of the search results may be indexed in a data structure that associates particular search results with a corresponding score $S_{r'}$. One example of such a data structure is the data structure for search results 166' illustrated in FIG. 1A. The score $S_{r'}$ represents how closely the r'th remaining thumbnail image corresponds to the user's interest, as measured by how much overlap there is between (a) keywords associated with the r'th thumbnail image and (b) keywords in the previously defined set of attractive keywords. A determination is made with respect to whether a score $S_{r'}$ for the r'th remaining thumbnail image already exists in such a data structure. See reference numeral 2520 in FIG. 2E. The score $S_{r'}$ will already exist if such as score has already been assigned to the r'th remaining thumbnail image as a result of a previous iteration of the technique described below. On the other hand, if no score has yet been assigned to the r'th remaining thumbnail image, then score $S_{r'}$ will not yet exist. In this case, where the score $S_{r'}$ does not yet exist, a new score $S_{r'}$ is added to the data structure and initialized such that $S_{r'}=0$. See reference numeral 2522 in FIG. 2E.

Search result ranking module 166 is configured to retrieve q keywords that are associated with the r'th remaining thumbnail image. See reference numeral 2530 in FIG. 2E. The q keywords can be retrieved from data repository 300, or in some cases can be extracted from the search results received from search engine 200. For example, the q keywords can be retrieved from data repository 300 in implementations where search engine 200 returns only image data in response to an executed search query. On the other hand, the q keywords can be extracted directly from the search results received from search engine 200 in implementations where search engine 200 returns both image and keyword data in response to an executed search query. To facilitate incremental analysis of the q keywords, search result ranking module 166 compares the fixed quantity q to an incrementing keyword counter q'. The incrementing keyword counter q' is initially set such that q'=1, and it increments as each of the q keywords is analyzed. See reference numeral 2540 in FIG. 2E. Once q'>q, analysis of the q keywords is complete. A determination is made with respect to whether the q'th keyword is present in the aforementioned set of attractive keywords. See reference numeral 2550 in FIG. 2E. If the q'th keyword is present in the set of attractive keywords, it will be associated with a corresponding score $S_{q'}$, as illustrated in the data structure for attractive keywords 164' illustrated in FIG. 1A. The score $S_{q'}$ represents how closely the q'th keyword corresponds to the user's interests. In one implementation, it is calculated as disclosed herein in conjunction with reference numerals 2331, 2333, and 2335 in FIG. 2C. In this case, the score $S_{r'}$ for the r'th remaining thumbnail image can be incremented by $S_{q'}$, such that $S_{r'}=S_{r'}+S_{q'}$. See reference numeral 2552 in FIG. 2E. In an alternative implementation, the score $S_{r'}$ for the r'th remaining thumbnail image can be incremented by a function of $S_{q'}$, such as $(2S_{q'})$, $\log(S_{q'})$, $\ln(S_{q'})$, or $\exp(S_{q'})$.

Once the score $S_{r'}$ for the r'th remaining thumbnail image has been appropriately incremented, if at all, the keyword counter q' is incremented such that q'=q'+1. See reference numeral 2560 in FIG. 2E. The incremented keyword counter q' is then compared to the total quantity of keywords q associated with the r'th remaining thumbnail image. See reference numeral 2610 in FIG. 2F. If q'≤q, then there are additional keywords that should be similarly processed by search result ranking module 166, as disclosed herein. See reference numeral 2550 and what follows in FIG. 2E. However, if q'>q, then all keywords have been analyzed. In this case, the remaining thumbnail image counter r' is incremented such that r'=r'+1. See reference numeral 2620 in FIG. 2F. The incremented remaining thumbnail image counter r' is then compared to the total quantity of remaining thumbnail images r. See reference numeral 2630 in FIG. 2F. If r'≤r, then there are additional remaining thumbnail images that should be similarly processed by search result ranking module 166, as disclosed herein. See reference numeral 2520 and what follows in FIG. 2E.

On the other hand, if r'>r, then all remaining thumbnail images have been evaluated and assigned a score $S_{r'}$, where r'=1, 2, 3, . . . , r. In this case, thumbnail view sub-module 162t sorts the r remaining thumbnail images in order of decreasing score $S_{r'}$. See reference numeral 2640 in FIG. 2F. The reorganized r remaining thumbnail images are then displayed in a stored list, wherein thumbnail images with a higher score $S_{r'}$ are displayed more prominently, such as near the top of the list of thumbnails. See reference numeral 2650 in FIG. 2F. FIG. 3D illustrates reordered thumbnail view user interface 3300 that includes a plurality of remaining reordered thumbnail images 3320. In this example implementation, the user interacted with images in a way that evinced an interest in the "Movie WB World" amusement park, such as by displaying an enlarged image associated with this amusement park (see FIG. 3B), and focusing on the "Movie WB World" logo in an enlarged preview image (see FIG. 3C). As a result, the search results are reorganized so as to more prominently position images that are associated with keywords deemed as attractive based on the observed user interactions. After the thumbnail images are reorganized based on scores $S_{r'}$, thumbnail view sub-module 162t determines whether another thumbnail image is selected. See reference numeral 2660 in FIG. 2F. If so, the techniques disclosed herein can be repeated. See reference numeral 2220 and what follows in FIG. 2B. This allows the organization of the search results to be continually refined based on ongoing user interaction observations. Optionally, this reorganization functionality can be toggled off, thereby enabling the user to "fix" the arrangement of the thumbnail images regardless of subsequently-observed user interactions. If no further thumbnail images are selected, method 2000 terminates.

Method 2000 advantageously allows digital images that correspond to a user's interest to be identified quickly, accurately, and intuitively. In particular, simply by intuitively browsing and exploring thumbnail images produced as the result of an image search, search interface application 160 refines and reorganizes the search results so as to more prominently display thumbnail images which are believed to be more relevant to the user's interests. There is no need for the user to refine search results by providing additional query terms or filters. Rather, the keywords corresponding to the assets with which the user interacts serve as an implicit filter for the remaining search results. This is particularly helpful for a user of a portable computing device since it allows the user to quickly locate images of interest without browsing through large quantities of thumbnails on a small display. This not only saves time, but also helps the user find images that are more relevant to his or her interests. User interactions with the search results are analyzed in an ongoing fashion so that the reorganization continues to be refined. Such techniques provide the use with more relevant search results, thereby promoting logical image discovery in a way that is intuitive, seamless, and personalized.

Further Example Embodiments

Numerous variations and configurations will be apparent in light of this disclosure. For instance, as illustrated in FIG. 4, one example embodiment provides a search result display method 4000. In one embodiment the search result display method 4000 includes receiving a plurality of search results, each of which corresponds to a digital image. See reference numeral 4100 in FIG. 4. See also reference numeral 2150 in FIG. 2A, which indicates that method 2000 for evaluating the relevancy of image-based search results includes sending search results and keyword metadata from search engine 200 to search interface application 160.

Method 4000 further includes displaying a first plurality of thumbnail images that collectively correspond to a first subset of the plurality of search results. Each of the first plurality of thumbnail images corresponds to one of the received search results. See reference numeral 4200 in FIG. 4. See also reference numeral 2210 in FIG. 2B, which indicates that method 2000 for evaluating the relevancy of image-based search results includes displaying search result thumbnails. In some cases the first subset of the plurality of search results encompasses the entire set of such results, such that, for example, in an implementation wherein five search results are received, the first subset of search results may include all five search results.

Method 4000 further includes detecting user input associated with a particular search result. See reference numeral 4300 in FIG. 4. See also reference numerals 2220 and 2250 in FIG. 2B, which indicate that method 2000 for evaluating the relevancy of image-based search results includes receiving user selection of a thumbnail image and detecting user interaction with an enlarged preview image.

Method 4000 further includes, in response to detecting the user input, adding a keyword to a set of attractive keywords. The added keyword is associated with the particular search result. See reference numeral 4400 in FIG. 4. See also reference numeral 2322 in FIG. 2C, which indicates that method 2000 for evaluating the relevancy of image-based search results includes adding a k'th keyword to a set of attractive keywords. Optionally, a score for the added k'th keyword is assigned, wherein the assigned score depends on the nature of the detected user input.

Method 4000 further includes identifying a second subset of the received search results. See reference number 4500 in FIG. 4. See also reference numeral 2460 in FIG. 2D, which indicates that method 2000 for evaluating the relevancy of image-based search results includes identifying r remaining images listed after an nth thumbnail selection.

Method 4000 further includes assigning a score to each of the search results in the second subset. The score for a given search result is incremented based on a keyword associated with the given search result being included within the set of attractive keywords. See reference numeral 4600 in FIG. 4. See also reference numeral 2552 in FIG. 2E, which indicates that method 2000 for evaluating the relevancy of image-based search results includes incrementing a score $S_{r'}$ of an r'th remaining thumbnail image by a score $S_{q'}$ of a q'th keyword. In one embodiment, the score $S_{r'}$ is initialized to zero when the r'th remaining thumbnail image is initially analyzed. From that point, the score $S_{r'}$ receives contributions associated with each of the q keywords associated with that r'th remaining thumbnail image. Each of these subsequent contributions is referred to herein as $S_{q'}$.

Method 4000 further includes establishing a ranking of the search results in the second subset based on their respective scores. See reference numeral 4700 in FIG. 4. See also reference numeral 2640 in FIG. 2F, which indicates that method 2000 for evaluating the relevancy of image-based search results includes sorting the r remaining thumbnail images in order of decreasing score $S_{r'}$.

Method 4000 further includes displaying a second plurality of thumbnail images that collectively correspond to the second subset of search results. Each of the second plurality of thumbnail images corresponds to one of the received search results. The second plurality of thumbnail images is displayed in order of the scores assigned to the corresponding search results in the second subset. See reference numeral 4800 in FIG. 4. See also reference numeral 2650 in FIG. 2F, which indicates that method 2000 for evaluating the relevancy of image-based search results includes displaying a sorted list of r remaining thumbnail images.

In some cases (a) each keyword in the set of attractive keywords is associated with a keyword score; and (b) the method further comprises incrementing the keyword score that is associated with the added keyword. In some cases (a) the first subset of the search results is associated with an initial display sequence; and (b) the second subset of the search results includes only search results listed after the particular search result in the initial display sequence. In some cases the second subset of the search results does not include the particular search result. In some cases the method further includes (a) displaying an enlarged preview image corresponding to the particular search result; and (b) receiving user input identifying a particular region of the enlarged preview image, wherein the added keyword is also associated with the particular region of the enlarged preview image. In some cases the method further includes (a) displaying an enlarged preview image corresponding to the particular search result; and (b) receiving user input cancelling display of the enlarged preview image, wherein the second plurality of thumbnail images is displayed in response to receiving the user input cancelling display of the enlarged preview image. In some cases receiving the plurality of search results further comprises receiving, for the particular search result, a particular thumbnail image and the keyword. In some cases the detected user input comprises selection of a thumbnail image corresponding to the particular search result. In some cases the second plurality of thumbnail images is displayed in order of decreasing scores assigned to the corresponding search results in the second subset, such that a thumbnail image associated with a search result having a highest score is displayed more prominently than other thumbnail images. In some cases the method further includes transmitting a search query to a search engine, wherein the plurality of search results are received in response to the search engine executing the search query.

Another example embodiment provides anon-transitory computer readable medium having instructions encoded thereon that, when executed by one or more processors, cause an image search process to be carried out. The process includes receiving a plurality of search results, each of which corresponds to a digital image. The process further includes displaying a first plurality of thumbnail images that collectively correspond to a first subset of the search results. Each of the first plurality of thumbnail images corresponds to one of the received search results. The process further includes, in response to detecting user input that indicates a selected thumbnail image, displaying an enlarged preview image of a particular digital image corresponding to the selected thumbnail image. The process further includes, in response to detecting user input that indicates backward navigation while the enlarged preview image is displayed, displaying a second plurality of thumbnail images that collectively correspond to a second subset of the search results. Each of the second plurality of thumbnail images corresponds to one of the received search results. The first and second subsets of search results are different from each other. In some cases the process further comprises (a) in response to detecting the user input that indicates the selected thumbnail image, adding a keyword to a set of attractive keywords, wherein the added keyword is associated with the selected thumbnail image; (b) assigning a score to each of the search results in the second subset, wherein the score for a given search result is incremented based on a keyword associated with the given search result being included within the set of attractive keywords; and (c) establishing a ranking of the search results in the second subset based on their respective scores; wherein the second plurality of thumbnail images is displayed according to the ranking. In some cases (a) a search result corresponding to the selected thumbnail image includes the particular digital image, a keyword, and a set of pixels that defines a region within the digital image; (b) the keyword is associated with the defined region; and (c) the process further comprises detecting user input that focuses on the region within the digital image defined by the set of pixels. In some cases (a) a search result corresponding to the selected thumbnail image includes the particular digital image, a keyword, and a set of pixels that defines a region within the digital image; and (b) the keyword is associated with the defined region. In some cases no intervening user input is received between receipt of the user input that indicates the selected thumbnail image, and receipt of the user input that indicates backward navigation. In some cases (a) the first subset includes a particular search result that corresponds to the selected thumbnail image; and (b) the second subset does not include the particular search result. In some cases the second subset includes a particular search result that is not included in the first subset.

Another example embodiment provides a search result interface system that includes a thumbnail view user interface that displays a plurality of thumbnail images and responds to selection of a displayed thumbnail image. The system further includes an enlarged preview user interface that displays an enlarged preview image in response to selection of the displayed thumbnail image in the thumbnail view user interface. The system further includes means for analyzing user interactions with images displayed in the thumbnail view user interface and the enlarged preview user interface. Analyzing the user interactions results in a data structure for attractive keywords that provides a keyword score for each of a plurality of attractive keywords. The system further includes means for ranking a plurality of search results based on a search result score calculated for each of the plurality of search results. The score for a given search result is incremented in response to a keyword associated with the given search result being included in the data structure for attractive keywords. In some cases the system further includes (a) a memory device; and (b) a processor that is operatively coupled to the memory device; wherein the data structure for attractive keywords is stored in the memory device; and wherein the processor is configured to execute instructions stored in the memory device that, when executed, cause functionality associated with the means for analyzing user interactions and the means for ranking the plurality of search results. In some cases the means for ranking the plurality of search results returns a data structure for search results that provides a search result score for each of the plurality of search results.

The foregoing disclosure has been presented for the purposes of illustration and description. It is not intended to be exhaustive or to limit the description to the particular described embodiments. Therefore many modifications and variations are possible in light of this disclosure. It is intended that the scope of the invention be limited not by this disclosure, but rather by the claims appended hereto.

What is claimed is:

1. A search result display method comprising:
   receiving a plurality of search results, each of which corresponds to a digital image, wherein a particular one of the received search results is associated with metadata that includes a keyword characterizing the particular search result;
   displaying a first plurality of thumbnail images that collectively correspond to a first subset of the plurality of search results, wherein each of the first plurality of thumbnail images corresponds to one of the received search results, and wherein the first subset includes the particular search result;
   detecting user input associated with the particular search result;
   in response to detecting the user input, extracting the keyword from the metadata and adding the keyword to a set of attractive keywords;
   identifying a second subset of the received search results;
   assigning a score to each of the search results in the second subset, wherein the score for a given search result in the second subset is incremented based on a keyword associated with the given search result being included within the set of attractive keywords;
   establishing a ranking of the search results in the second subset based on their respective scores; and
   displaying a second plurality of thumbnail images that collectively correspond to the second subset of search results, wherein each of the second plurality of thumbnail images corresponds to one of the received search results, and wherein the second plurality of thumbnail images is displayed in order of the scores assigned to the corresponding search results in the second subset.

2. The search result display method of claim 1, wherein:
   each keyword in the set of attractive keywords is associated with a keyword score; and
   the method further comprises incrementing the keyword score that is associated with the added keyword.

3. The search result display method of claim 1, wherein:
   the first subset of the search results is associated with an initial display sequence; and
   the second subset of the search results includes only search results listed after the particular search result in the initial display sequence.

4. The search result display method of claim 1, wherein the second subset of the search results does not include the particular search result.

5. The search result display method of claim 1, further comprising:
   displaying an enlarged preview image corresponding to the particular search result; and
   receiving user input identifying a particular region of the enlarged preview image, wherein the added keyword characterizes the particular region of the enlarged preview image.

6. The search result display method of claim 1, further comprising:
   displaying an enlarged preview image corresponding to the particular search result; and
   receiving user input cancelling display of the enlarged preview image, wherein the second plurality of thumbnail images is displayed in response to receiving the user input cancelling display of the enlarged preview image.

7. The search result display method of claim 1, wherein receiving the plurality of search results further comprises receiving, for the particular search result, a particular thumbnail image and the keyword.

8. The search result display method of claim 1, wherein the detected user input comprises selection of a thumbnail image corresponding to the particular search result.

9. The search result display method of claim 1, wherein the second plurality of thumbnail images is displayed in order of decreasing scores assigned to the corresponding search results in the second subset, such that a thumbnail image associated with a search result having a highest score is displayed more prominently than other thumbnail images.

10. The search result display method of claim 1, further comprising transmitting a search query to a search engine, wherein the plurality of search results are received in response to the search engine executing the search query.

11. A non-transitory computer readable medium having instructions encoded thereon that, when executed by one or more processors, cause an image search process to be carried out, the process comprising:
    receiving a plurality of search results, each of which corresponds to a digital image;
    displaying a first plurality of thumbnail images that collectively correspond to a first subset of the search results, wherein each of the first plurality of thumbnail images corresponds to one of the received search results;
    in response to detecting user input that indicates a selected thumbnail image, displaying an enlarged preview image of a particular digital image corresponding to the selected thumbnail image; and
    in response to detecting user input that indicates backward navigation while the enlarged preview image is displayed, displaying a second plurality of thumbnail images that collectively correspond to a second subset of the search results, wherein each of the second plurality of thumbnail images corresponds to one of the received search results, and wherein the first and second subsets of search results are different from each other.

12. The non-transitory computer readable medium of claim 11, wherein the process further comprises:
    in response to detecting the user input that indicates the selected thumbnail image, adding a keyword to a set of attractive keywords, wherein the added keyword is associated with the selected thumbnail image;
    assigning a score to each of the search results in the second subset, wherein the score for a given search result is incremented based on a keyword associated with the given search result being included within the set of attractive keywords; and
    establishing a ranking of the search results in the second subset based on their respective scores;
    wherein the second plurality of thumbnail images is displayed according to the ranking.

13. The non-transitory computer readable medium of claim 11, wherein:
    a search result corresponding to the selected thumbnail image includes the particular digital image, a keyword, and a set of pixels that defines a region within the digital image;
    the keyword is associated with the defined region; and
    the process further comprises detecting user input that focuses on the region within the digital image defined by the set of pixels.

14. The non-transitory computer readable medium of claim 11, wherein:
- a search result corresponding to the selected thumbnail image includes the particular digital image, a keyword, and a set of pixels that defines a region within the digital image; and
- the keyword is associated with the defined region.

15. The non-transitory computer readable medium of claim 11, wherein no intervening user input is received between receipt of the user input that indicates the selected thumbnail image, and receipt of the user input that indicates backward navigation.

16. The non-transitory computer readable medium of claim 11, wherein:
- the first subset includes a particular search result that corresponds to the selected thumbnail image; and
- the second subset does not include the particular search result.

17. The non-transitory computer readable medium of claim 11, wherein the second subset includes a particular search result that is not included in the first subset.

18. A search result interface system comprising:
- a thumbnail view user interface that displays a plurality of thumbnail images and responds to selection of a displayed thumbnail image;
- an enlarged preview user interface that displays an enlarged preview image in response to selection of the displayed thumbnail image in the thumbnail view user interface;
- means for analyzing user interactions with images displayed in the thumbnail view user interface and the enlarged preview user interface, wherein analyzing the user interactions results in a data structure for attractive keywords that provides a keyword score for each of a plurality of attractive keywords, wherein at least one of the attractive keywords is extracted from metadata associated with the enlarged preview image; and
- means for ranking a plurality of search results based on a search result score calculated for each of the plurality of search results, wherein the score for a given search result is incremented in response to a keyword associated with the given search result being included in the data structure for attractive keywords.

19. The search result interface system of claim 18, further comprising:
- a memory device; and
- a processor that is operatively coupled to the memory device;
- wherein the data structure for attractive keywords is stored in the memory device; and
- wherein the processor is configured to execute instructions stored in the memory device that, when executed, cause functionality associated with the means for analyzing user interactions and the means for ranking the plurality of search results.

20. The search result interface system of claim 18, wherein the means for ranking the plurality of search results returns a data structure for search results that provides the search result score for each of the plurality of search results.

* * * * *